March 2, 1943.  O. W. HAHN  2,312,834

GAS PILOT BURNER

Filed Jan. 12, 1942

INVENTOR.
OTTO W. HAHN
BY
ATTORNEY.

Patented Mar. 2, 1943

2,312,834

UNITED STATES PATENT OFFICE 2,312,834

GAS PILOT BURNER

Otto W. Hahn, San Francisco, Calif., assignor to Industrial Research Laboratories, Ltd., San Francisco, Calif., a corporation of Nevada Application January 12, 1942, Serial No. 426,411

4 Claims. (Cl. 138—43)

This invention relates to gas pilot burners as used to insure the relighting of burner flames in heating equipment, and the principal object of the invention is to provide a pilot burner with a more satisfactory adjustable control of gas flow than heretofore obtained, and one which combines the use of a spiral tortuous gas passage as a throttling means, yet so constructed as to provide for reducing the effective area of the spiral passage over a considerable portion of its length, and whereby effective choking down of the gas flow may be had without placing the entire choking action upon a limited or minute opening with consequent liability to become clogged.

Other features and advantages are simplicity and cheapness of construction.

In the accompanying drawing.

Figure 1:
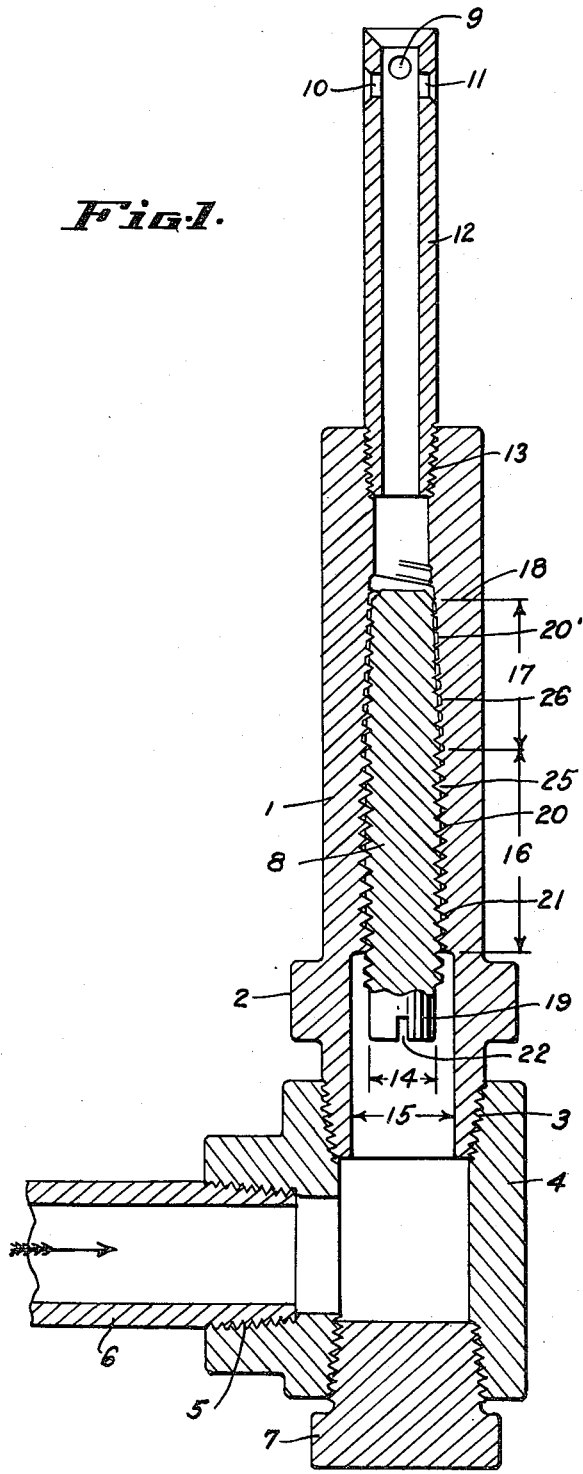
Fig. 1 is a vertical sectional elevation of a gas pilot burner made in accordance with my invention, and shown in heroic size to clarify the form of the thread mutilation.

Before describing the invention, it may be stated that it is old to provide a gas pilot in which the gas supply passage is threaded and a loosely fitting screw plug in the bore provides a small spiral passageway for the gas, but in the present invention, while a screw plug is used in a threaded hole, it is not loose, and means is provided for gradually reducing the effective cross sectional area of the gas passage over a considerable length of the thread.

In the drawing 1 is the main tubular body of the pilot formed with a nut at 2 and screwed at 3 into a hollow pipe fitting 4 in turn screwed at 5 to a gas supply pipe 6. The lower end of the fitting 4 is open and closed with a screw plug 7 so as to make the interior of tubular body 1 accessible for adjusting the throttle screw or plug 8 for controlling the size of the flame.

The flame or flames issue from the top and side openings 9, 10, 11 of a tubular burner tip 12 screwed to the upper end of the pilot body 1 as at 13.

The most important feature of the pilot burner is the particular relation of the externally threaded screw or plug 8 to the internally threaded bore of the tubular body 1. The body is first drilled with a hole of a suitable diameter 14 adapted to provide a full V thread when tapped. This hole is preferably counterbored to larger size as at 15 for a short distance from the lower end of the body 1 to clear the threads of the screw 8.

The threading of the bore 14 is done with a standard tapered tap so as to provide a straight run of full threads 25 for a distance about as designated 16, and a tapered run for about the distance 17 as produced by such a tap, and which thread takes the form of gradually increased breadth of flattened bottoms substantially as shown in the drawing at 26 and terminates in the bore at the line 18.

The form of the threads on the screw or plug 8 are the complement of the bore threads in that they are full cut for at least the distance 16, preferably a few threads more as shown, and they are tapered for the distance 17. However, in forming the threads on the screw they may first be cut full depth and with the screw of uniform diameter from end to end, (except for the reduced diameter of the slotted head 19), and after cutting, the points of the threads are removed in a lathe as by the use of a file to flatten them as indicated at 20 so as to form a small spiral passageway 21 along the bottoms of the internal threads of the bore.

For the distance 17 the screw is also tapered down to the line 18 preferably at the same angle as the taper of the tap angle but of slightly smaller diameter so as to maintain a very minute spiral clearance at the tops of the flattened threads as indicated at 20', but which may be almost closed by screwing the plug 8 in as far as it will go.

The threading of the screw or plug should preferably be a nice fit so that the screw will stay in any position of adjustment along the threaded bore, and it is manifest that upon unscrewing the plug the spiral passage along the tapered portion will enlarge, and also the threaded straight portion will back out into the counterbore so as to shorten the portion 20 of the spiral passage to thereby simultaneously reduce the friction of the gas flowing therethrough. Thus any desired throttling control of the flow may be had from zero to maximum, yet without the objectionable feature of a needle valve, for an adjustment to give equal throttling effect the actual spiral opening of the present throttling elements is much greater.

The thread may be single or multiple lead, and the invention may be used with other than V threads, although the latter are preferable as yielding the smallest spiral passage. Instead of filing off the tops of the thread on the rod and tapering it after threading, it may first be turned to the correct final outside diameter and taper wanted, and thereafter threaded, or it may be turned to the reduced diameter for the straight portion, and the tapered portion formed after cutting the threads.

Figure 2:
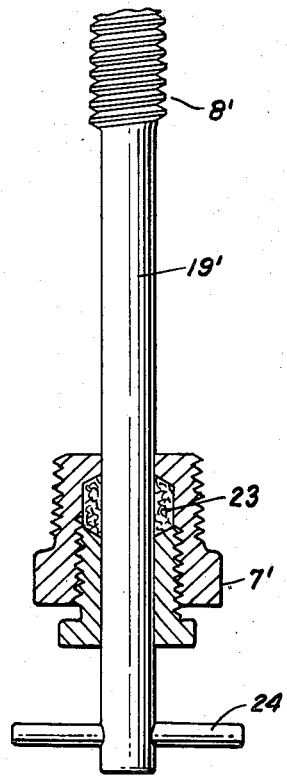
Fig. 2 is a sectional view of an optional construction of the lower end of the device of Fig. 1.

The construction shown in Fig. 1 provides for sealing the screw plug in adjusted position so that it will not be liable to be tampered with as it requires first that closure plug 7 be removed and a small screw driver be used to reach the slot 22 of the screw plug 8. However, for conditions where the adjustability should be accessible at all times the construction of Fig. 2 may be used, and where the screw 8' is lengthened to form a stem 19' and extended through a stuffing box 23 formed in plug 7', and the stem is provided with a cross pin 24 or suitable thumb nut for turning it.

Having thus described my improved gas pilot burner and the manner of its use, what I claim is:

1. In a gas pilot burner having an internally threaded gas supply passage with a threaded screw plug throttling element screwed therein, the exterior of the thread of said passage being tapered to smaller diameter toward one end of the passage and the screw plug similarly tapered at one end, and the tips of the threads of one of the members being removed but the threaded element being otherwise a snug threaded fit within the passage at all points of adjustment therealong.

2. In a gas pilot burner having an internally V threaded gas supply passage with a V threaded screw plug throttling element screwed therein, the exterior only of the thread of said passage being cylindrical for a distance and then tapered to smaller diameter toward one end of the passage and the screw plug similarly shaped and tapered at one end, and the tips of the threads of one of the members being removed and the threads become progressively shallower toward the small end of the passage.

3. In a gas pilot burner having an internally threaded gas supply passage with a threaded screw plug throttling element screwed therein, the exterior of the thread of said passage being of uniform diameter for a distance along the passage and tapered to smaller diameter toward one end of the passage and the screw plug similarly tapered at one end and of uniform diameter for the remainder of its threaded portion and the tips of the threads of one of the members being removed, the threads of both the plug and the passage extending also over their tapered portions and becoming progressively shallower toward the small end of the tapered portions.

4. In a gas pilot burner having an internally threaded gas supply passage with a threaded screw plug throttling element screwed therein, the exterior of the thread of said passage being tapered to smaller diameter toward one end of the passage and the screw plug similarly tapered at one end, and the tips of the threads of one of the members being removed, said passage enlarged adjacent the large end of the plug with the large end of the plug freely projecting into the enlarged portion and provided with a head for turning the screw plug, a side inlet for said passage adjacent the enlarged portion of the passage, and a removable closure at the end of the enlarged portion of the passage to provide access to the head of the screw plug for turning the same.

OTTO W. HAHN.